(12) United States Patent
Caprioli et al.

(10) Patent No.: US 7,509,472 B2
(45) Date of Patent: Mar. 24, 2009

(54) COLLAPSIBLE FRONT-END TRANSLATION FOR INSTRUCTION FETCH

(75) Inventors: Paul Caprioli, Mountain View, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 239 days.

(21) Appl. No.: 11/345,165

(22) Filed: Feb. 1, 2006

(65) Prior Publication Data

US 2007/0180218 A1    Aug. 2, 2007

(51) Int. Cl.
*G06F 9/26* (2006.01)
*G06F 9/30* (2006.01)
*G06F 9/40* (2006.01)

(52) U.S. Cl. .................. 711/204; 712/237; 712/238; 712/239; 712/207

(58) Field of Classification Search .............. None
See application file for complete search history.

(56) References Cited

U.S. PATENT DOCUMENTS

| 3,800,291 A | 3/1974 | Cocke et al. ............ 340/172.5 |
| 2004/0019762 A1 | 1/2004 | Fukuoka et al. ............ 711/203 |
| 2004/0025161 A1* | 2/2004 | Chauvel et al. ............ 718/102 |
| 2005/0216713 A1* | 9/2005 | Prasky et al. ............ 712/238 |
| 2006/0149981 A1* | 7/2006 | Dieffenderfer et al. ...... 713/320 |

FOREIGN PATENT DOCUMENTS

| EP | 0 704 805 | 4/1996 |
| JP | 11-134256 | 5/1999 |
| WO | WO 2006/060198 | 6/2006 |

* cited by examiner

*Primary Examiner*—Reginald G Bragdon
*Assistant Examiner*—Baboucarr Faal
(74) *Attorney, Agent, or Firm*—Gunnison, McKay & Hodgson, L.L.P.; Forrest Gunnison

(57) ABSTRACT

Address translation for instruction fetching can be obviated for sequences of instruction instances that reside on a same page. Obviating address translation reduces power consumption and increases pipeline efficiency since accessing of an address translation buffer can be avoided. Certain events, such as branch mis-predictions and exceptions, can be designated as page boundary crossing events. In addition, carry over at a particular bit position when computing a branch target or a next instruction instance fetch target can also be designated as a page boundary crossing event. An address translation buffer is accessed to translate an address representation of a first instruction instance. However, until a page boundary crossing event occurs, the address representations of subsequent instruction instances are not translated. Instead, the translated portion of the address representation for the first instruction instance is recycled for the subsequent instruction instances.

11 Claims, 7 Drawing Sheets

COLLAPSIBLE FRONT-END TRANSLATION FOR INSTRUCTION FETCH

BACKGROUND

1. Field of the Invention

The present invention relates to the field of computers. More specifically, the present invention relates to computer architecture.

2. Description of the Related Art

In general, instruction instances for a portion of a program are stored in an instruction cache. Since many instruction instances are stored in virtual memory, an address translation buffer stores the physical addresses and the virtual addresses for address translation. During instruction fetching, a fetch target is identified with a virtual address, which is then translated with the address translation buffer into a physical address. The corresponding instruction instance is read out of the instruction cache based on the physical address.

SUMMARY

It has been discovered that address translations for instruction instances during a fetch stage can be limited to page boundary crossing events. During fetching of instruction instances in a same page, a processing unit can recycle a translated portion of an address representation for a predecessor instruction instance also in the same page. Recycling previous translations allows accessing of an address translation buffer to be avoided. When a page boundary crossing event is detected, the address translation buffer is accessed and a portion of an untranslated address representation is translated. If a page boundary crossing event is not detected, then the translated portion of a previous address representation can be recycled. The subsequent instruction instances on the same page are fetched with their untranslated portions of their address representations and the translated portion of the address representation of the predecessor instruction instance.

These and other aspects of the described invention will be better described with reference to the Description of the Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE EMBODIMENT(S)

The description that follows includes exemplary systems, methods, techniques, instruction sequences and computer program products that embody techniques of the present invention. However, it is understood that the described invention may be practiced without these specific details. For instance, although the following description refers to a logic for implementing some instruction fetching functionality being shared among multiple cores, a portion or all of that functionality may be implemented separately for each core. In addition, embodiments may implement more of the fetching or less of the fetching functionality in the shared logic. In other instances, well-known protocols, structures and techniques have not been shown in detail in order not to obscure the invention.

The following description refers to an instruction instance, a fetch target, and an address representation. The term instruction instance is used to refer to a particular instance of an instruction. For example, 'ld' is an instruction, and 'ld &A, r1' is an instance of a load instruction. The term fetch target is used to refer to an indication of an instruction instance that is targeted by a fetch operation (i.e., an instruction instance that is to be fetched). In general, a fetch target is indicated with a physical address, a virtual address, etc., where an instruction instance can be found within an address space. The term address representation is used to refer to a value that corresponds to an address. For example, an address representation may be a virtual address that can be translated into a physical address, a virtual address that can be translated into another virtual address, etc.

In a high-frequency multi-core architecture, bypassing front-end translation of an address representation for instruction fetching allows more efficient operation of a pipeline in such an architecture. Moreover, bypassing translation reduces power consumption in hardware implementing such an architecture since access of the address translation buffer can be avoided.

Figure 1:
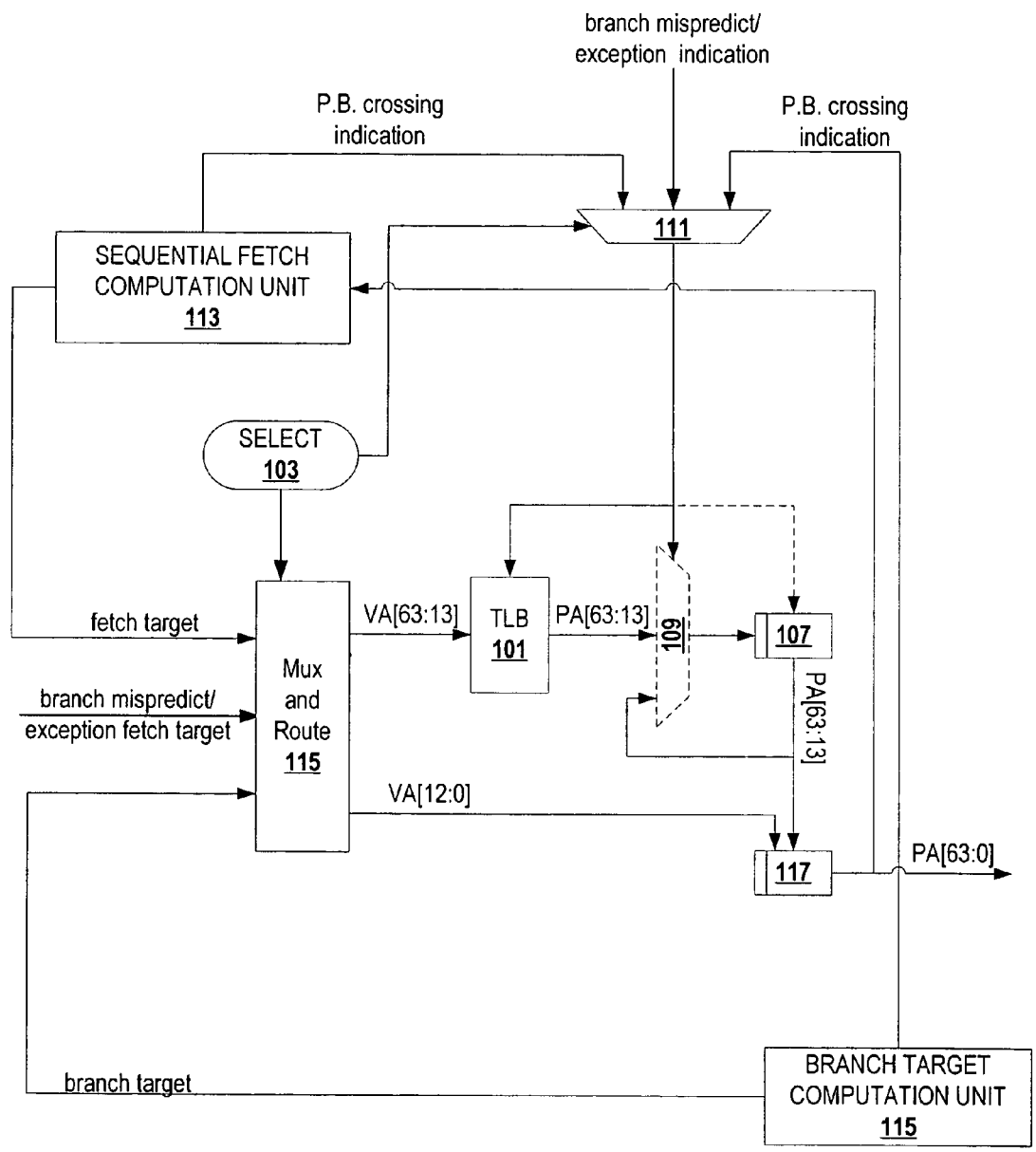
FIG. 1 depicts example logic for bypassing front-end address translation for instruction fetching.

FIG. 1 depicts example logic for bypassing front-end address translation for instruction fetching. A mux and route unit 115 is coupled to receive three inputs. The mux and route unit 115 is also coupled to output to a translation buffer 101 and a store element 117. The translation buffer 101 is coupled to output to the multiplexor 109. The multiplexor 109 is coupled to output to a store element 107. The store element 107 is coupled to output to the store element 117 and output to the multiplexor 109. A multiplexor 111 is coupled to output a control signal to the translation buffer 101, the multiplexor 109, and optionally, the store element 107. The control signal from the multiplexor 111 controls input selection by the multiplexor 109. With regard to the optional input to the store element 107, the output from the multiplexor 111 acts as an enable signal for the store element 107 to discard its contents and capture the output from the multiplexor 109. In addition, the control signal from the multiplexor 111 causes the translation buffer 101 to skip translation of an address representation received from the mux and route unit 115, thus saving power. A select logic 103 is coupled to output a control signal to the mux and route unit 15 and to the multiplexor 111. The control signal from the select logic 103 controls input selection by the mux and route unit 115. The control signal from the select logic 103 also controls selection of input by the multiplexor 111. A sequential fetch computation unit 113 is coupled to receive input from the store element 117. The sequential fetch computation unit 113 is coupled to output a page boundary crossing indication to the multiplexor 111 and coupled to output an incremented fetch target indication to the mux and route unit 115. A branch target computation unit 115 is coupled to output a page boundary crossing indication to the multiplexor 111, and is coupled to output a computed branch target to the mux and route unit 115. The third input into the multiplexor 111 is an indication of a branch mispredict or exception. The third input into the mux and route unit 115 is a fetch target corresponding to a branch mispredict or exception (e.g., interrupt, trap, etc.).

The select logic 103 controls input selection by the mux and route unit 115 and the multiplexor 111 in accordance with execution flow. If the select logic 103 causes the mux and route unit 115 to select input from the sequential fetch computation unit 113, then the select logic 103 will also cause the multiplexor 111 to select the page boundary crossing indication output from the sequential fetch computation unit 113. The sequential fetch computation unit 113 outputs a page boundary crossing indication if it detects a carryover at a particular bit position when incrementing the input from the store element 117. For example, the store element 117 outputs a translated address representation of an instruction instance and the sequential fetch computation unit 113 increments the translated address representation by an amount sufficient so that the fetch target is the next sequential instruction instance (e.g., incrementing a physical address by four bytes). If a page boundary crossing event occurs during sequential execution of instruction instances, then fetching is performed after a next page of instruction instances is loaded into an instruction cache and the corresponding untranslated and translated address representations are loaded into the translation buffer 101. The input of a next page of instruction instances is not depicted in order to avoid obfuscating the described embodiments. The input selected by the mux and route unit 115, in accordance with the select logic 103, is routed to the translation buffer 101 and the store element 117 appropriately. The mux and route unit 115 supplies the translation buffer 101 with portion of a selected input fetch target for translation (e.g., bits [63:13] of a virtual address). The mux and route unit 1 15 supplies the store element 117 with a portion of the selected input fetch target that is not translated (e.g., bits [12:0] of a virtual address). It should be appreciated that the size of address representations and apportionment of address representations to the translation buffer 101 and the store element 117 can vary (e.g., a larger or smaller fetch target address representation, fewer or greater number of bits supplied to the translation buffer 101 for translation, etc.). If a page boundary crossing event has not occurred, then the multiplexor 111 will output a signal to the translation buffer 101 to cause the translation buffer 101 to refrain from translating the input from the mux and route unit 115. Otherwise, if there is a page boundary crossing event, then the translation buffer 101 is accessed to translate the output from the mux and route unit 115. The translation buffer 101 outputs a translation to the multiplexor 109. If there is no page boundary crossing event, then the control signal from the multiplexor 111 will cause the multiplexor 109 to select input from the store element 107, thus recycling a previously translated address representation (e.g., bits [63:13] of a previously translated address representation [63:13]). In another implementation, an enable signal from the multiplexor 111 controls whether the store element 107 captures output from the translation buffer 101, thus foregoing the multiplexor 109. If a page boundary crossing event occurs, then the enable signal causes the store element 107 to discard its contents and capture output from the translation buffer 101. Otherwise, if there is no page boundary crossing event, then the store element 107 does not capture output from the translation buffer 101. The value stored in the store element 107 is output to the store element 117 in accordance with flow of the pipeline. If there is a page boundary crossing event, then the multiplexor 111 causes the multiplexor 109 to select the translated address representation from the translation buffer 101. The multiplexor 109 then stores the selected input into the store element 107. The value stored in the store element 107 is then supplied to the store element 117. The output from the mux and route unit 115 and the store element 107 are aggregated in the store element 117 to form an address representation for a fetch target to locate a current instruction instance in an instruction cache. The store element 117 outputs the address representation to continue flowing down the pipeline for fetching of a corresponding instruction instance. Recycling of a portion of a predecessor translated address representation allows translation to be avoided, thus reducing power consumption and increasing pipeline flow efficiency.

Figure 2:
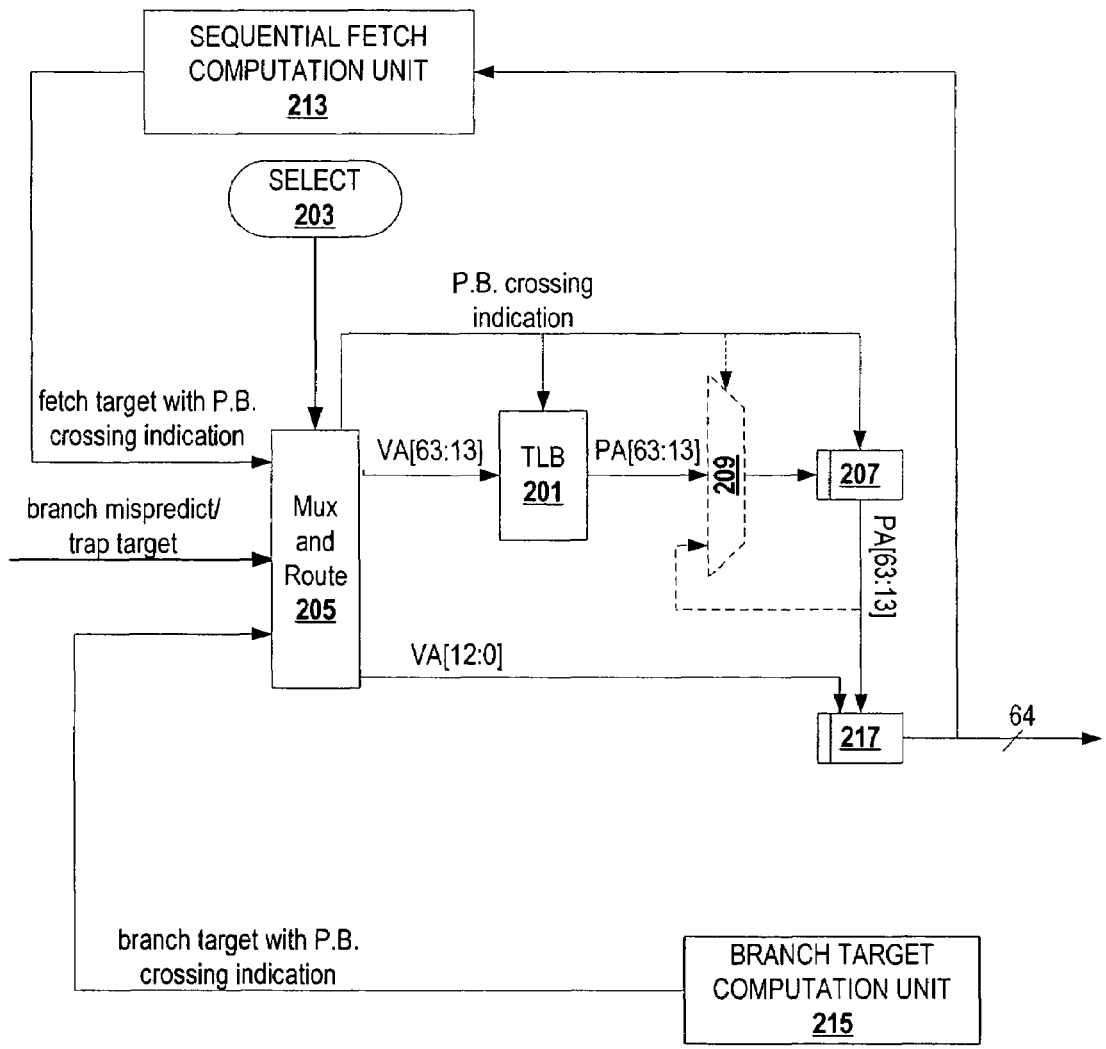
FIG. 2 depicts example logic bypassing front-end address translation for instruction fetching with embedded page boundary crossing event indications.

FIG. 2 depicts example logic bypassing front-end address translation for instruction fetching with embedded page boundary crossing event indications. A mux and route unit 205 is coupled to receive inputs and coupled to output a portion of an address representation to a translation buffer 201 for translation. The mux and route unit 205 is also coupled to output a portion of an address representation, which is not translated, to a store element 217. The translation buffer 201 is coupled to output a translated address representation to the multiplexor 209. The multiplexor 209 is coupled to output a selected value to a store element 207. The store element 207 is coupled to output to the multiplexor 209 and the store element 217. In another embodiment, the translation buffer 201 is coupled to output to the store element 207, thus foregoing the multiplexor 209. The store element would be coupled to receive an enable signal to allow or prevent the translation buffer 201 from writing to the store element 207. A branch target computation unit 215 is coupled to output a branch target to the mux and route unit 205. The sequential fetch computation unit 213 is coupled to output an incremented fetch target indication to the mux and route unit 205. The third input into the mux and route unit 205 is an indication of a branch mispredict/exception target. A select logic 203 is coupled to control input selection of the mux and route unit 205.

In FIG. 2, indications of page boundary crossing events are embedded in the values input into the mux and route unit 205. If the sequential fetch computation unit 213 detects a carryover at a bit position associated with a page boundary crossing event, then the indication is embedded in the fetch target indication (or accompanies the fetch target indication in a packet) computed by the sequential fetch computation unit 213. Similarly, the branch target computation unit 215 indicates a page boundary crossing event when it detects a carryover at a bit position associated with a page boundary crossing event. The branch target computation unit 215 transmits a value to the mux and route unit 205 that comprises a computed branch target and an indication of a page boundary crossing event. The mux and route unit 205 selects an input in accordance with the selection logic control signal 203. The mux and route unit 205 extracts the page boundary crossing event indication and forwards the page boundary crossing event indication (or a corresponding indication) to the translation buffer 201 and the store element 207 as a control signal. If a page boundary crossing event has occurred, then the translation buffer 201 will translate the input address representation. The control signal to the store element 207 enables and disables writing to the store element 207. If a page boundary crossing event occurs, then writing is enabled and the store element 207 captures a translated address representation from the translation buffer 201. If a page boundary crossing event does not occur, then writing is disabled (or not enabled) and the store element does not capture output from the translation buffer 201. In another example, the multiplexor 209 selects input from either the translation buffer 201 or the store element 207 in accordance with the indication of a page boundary crossing event. The store element 207 does not receive an enable signal and accepts values from the multiplexor 209. The store element 207 forwards the stored translated address representation as to the store element 217. As described above with reference to 117 of FIG. 1, the store element 217 sends down the pipeline the aggregate of the translated address representation from the store element 207 and the portion of the address representation received from the mux and route unit 215.

Figure 3:
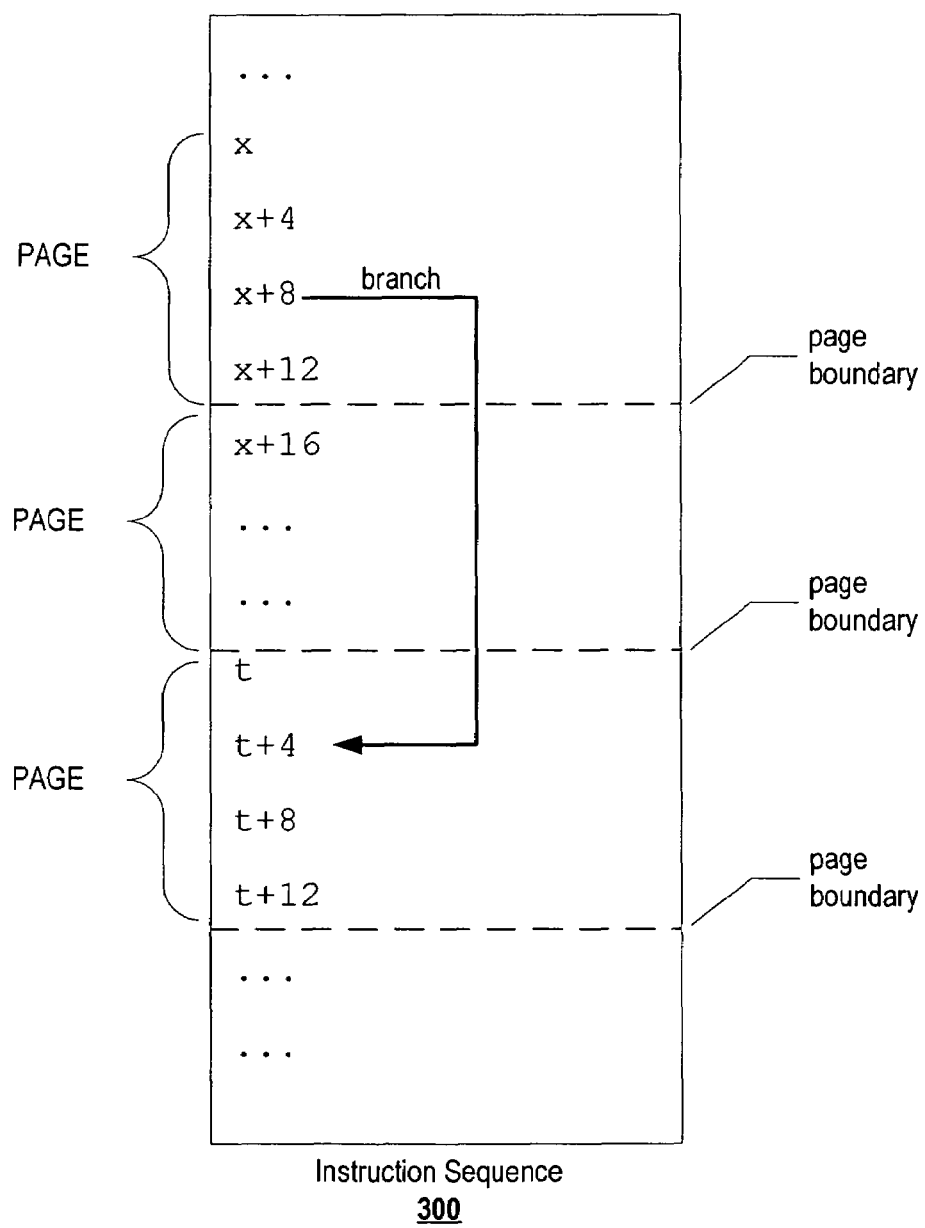
FIG. 3 depicts an example of an instruction sequence with various page boundaries.

FIG. 3 depicts an example of an instruction sequence with various page boundaries. In FIG. 3, a sequence of instructions 300 resides across multiple pages. A first depicted page includes a branching type instruction that branches to a target instruction within a third page. If, during execution, the branch type instruction instance at x+8 is taken, then an indication of a page boundary crossing event should cause translation of an address representation for the instruction instance at t+4, which is the target of the branch instruction at the x+8 location. Page boundary crossings may also occur during linear execution. For example, execution flow from the instruction instance at x+12 to the instruction instance at x+16 is linear, but crosses the page boundary. This linear page boundary crossing event from the instruction instance at x+12 to the instruction instance at x+16 also requires an address translation (e.g., translation of the page-based address representation of x+16 to the full physical address).

Figure 4:
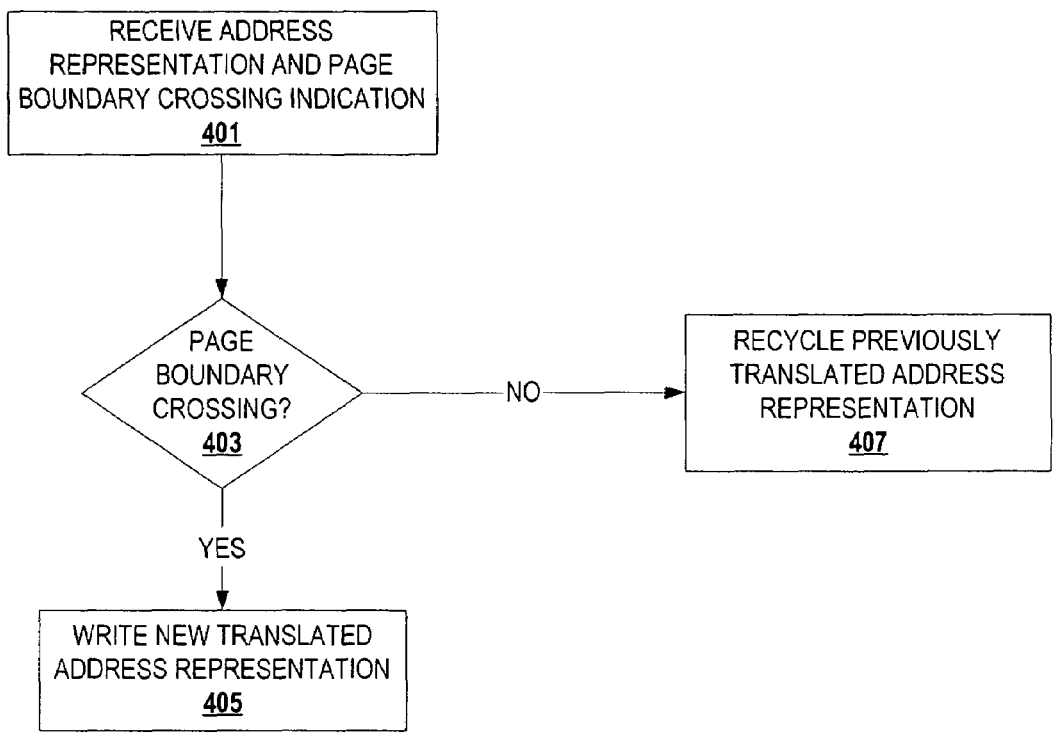
FIG. 4 depicts an example flowchart for writing a translated address representation for later recycling.

FIG. 4 depicts an example flowchart for writing a translated address representation for later recycling. At block 401, an address representation and a page boundary crossing event indication are received. At block 403, it is determined whether a page boundary crossing event has occurred according to the received page boundary crossing event indication. If a page boundary crossing event has occurred, then control flows to block 405. If a page boundary crossing event has not occurred, then control flows to block 407.

At block 405, a new translated address representation is written into a store element.

At block 407, a previously translated address representation is recycled.

Figure 5:
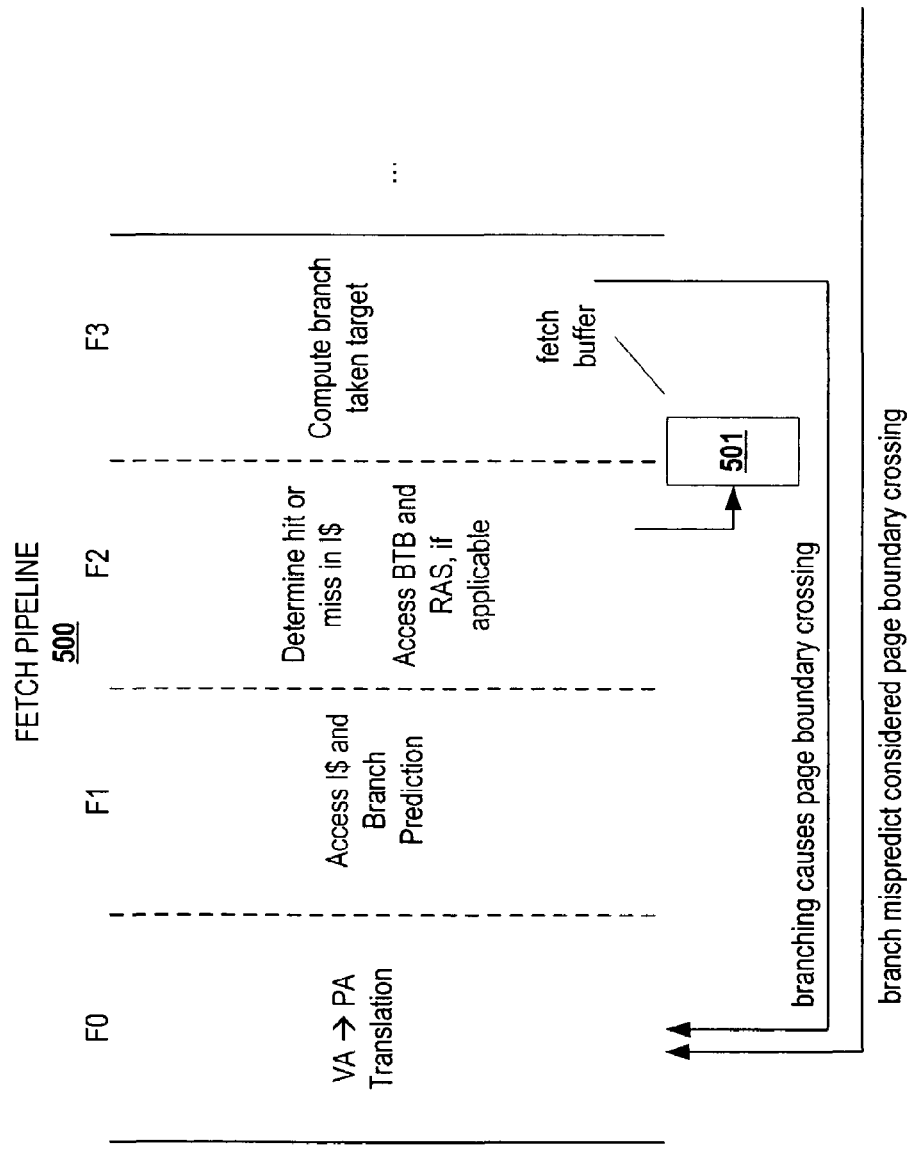
FIG. 5 depicts an example fetch pipeline that selectively bypasses address translation.

FIG. 5 depicts an example fetch pipeline that selectively bypasses address translation. In a high frequency execution pipeline, some of the stages can be divided into substages. A stage that includes multiple substages can be viewed as a pipeline from the perspective of the divided stage. FIG. 5 assumes a high frequency instruction pipeline that allows the fetch stage to be divided into four substages. From the perspective of the fetch stage, the multiple substages form a pipeline. A fetch pipeline 500, in FIG. 5, comprises fetch substages F0 through F3. In substage F0, virtual addresses are translated into physical addresses. In fetch substage F1, branch prediction is performed and an instruction cache is accessed. In a fetch substage F2, it is determined whether the address output by substage F0 hits or misses in the instruction cache. In addition, a branch target buffer and a return address stack are accessed in substage F2, if applicable. In the substage F3, a branch taken target is computed. During the transition from the substages F2 to F3, an instruction instance that is read out of the instruction cache is fetched into a fetch buffer 501. Branch targets computed in the substage F3 are sent back to the substage F0. If a target of the taken branch does not cause a page boundary crossing event, then the address translation performed in substage F0 is bypassed, collapsing the substage F0. Substage F0 is not collapsed if a branch mispredict is indicated from further down the instruction pipeline. Although not depicted, substage F0 is also not collapsed if a page boundary crossing event occurs during linear execution.

Figure 6:
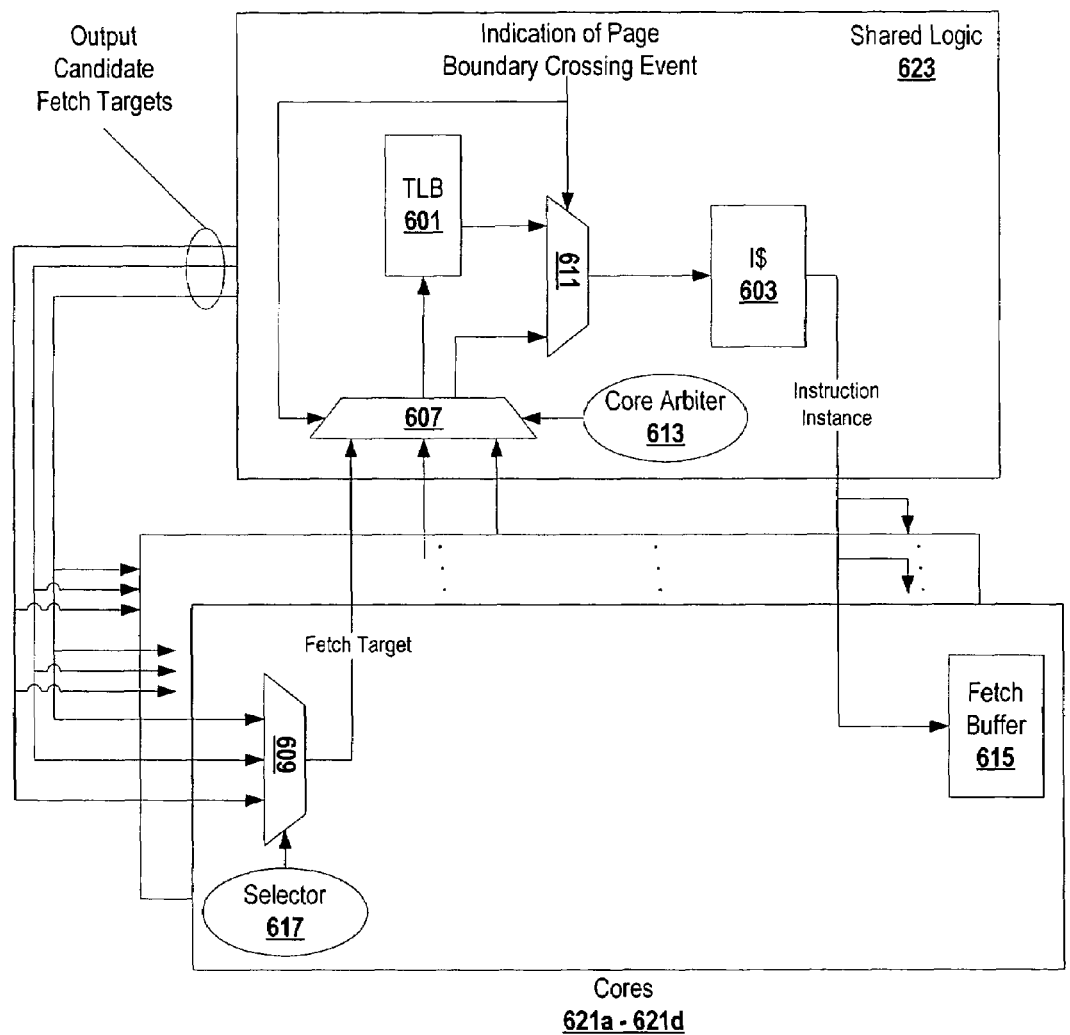
FIG. 6 depicts a system with multiple cores.

FIG. 6 depicts a system with multiple cores. In FIG. 6, multiple cores 621A through 621D are coupled with a shared logic 623. Each of the cores 621A through 621D include a multiplexor, selector, and a fetch buffer. As depicted in FIG. 6, the core 621A includes a multiplexor 609, selector 617, and a fetch buffer 615. The shared logic 623 includes a multiplexor 607, translation buffer 601, multiplexor 611, and instruction cache 603. In addition, the multiplexor 607 is controlled by core arbiter 613. The shared logic 623 outputs a candidate fetch target to all of the cores 621A through 621D. Each of the cores 621A through 621D selects one of the candidate fetch targets and outputs the selected fetch target to the shared logic 623. The selector 617 controls which of the output candidate fetch targets are selected by the multiplexor 609. The core arbiter 613 controls the multiplexor 607 to select a fetch target from one of the cores 621A through 621D at a particular time. Multiplexor 607 also determines whether the selected input fetch target is routed to the translation buffer 601 or the multiplexor 611 and in accordance with a control signal that corresponds to an indication of a page boundary crossing event. Although depicted in a single block of logic (i.e., to the multiplexor 607), core arbitration and translation bypass logic may be implemented in multiple or a single logic block (e.g., a block for core arbitration and a block to route input selected by core arbitration). An indication of a page boundary crossing event controls whether the multiplexor 611 selects input from the translation buffer 601 or the multiplexor 607. The selected input then outputs from the multiplexor 611 to the instruction cache 603. Assuming a hit in the instruction cache 603, an instruction instance is read out to the fetch buffers of the multiple cores 621A through 621D, including the fetch buffer 615.

The described invention may be provided as a computer program product, or software, that may include a machine-readable medium having stored thereon instructions, which may be used to program a computer system (or other electronic device) to perform a process according to the presently described embodiments. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 7:
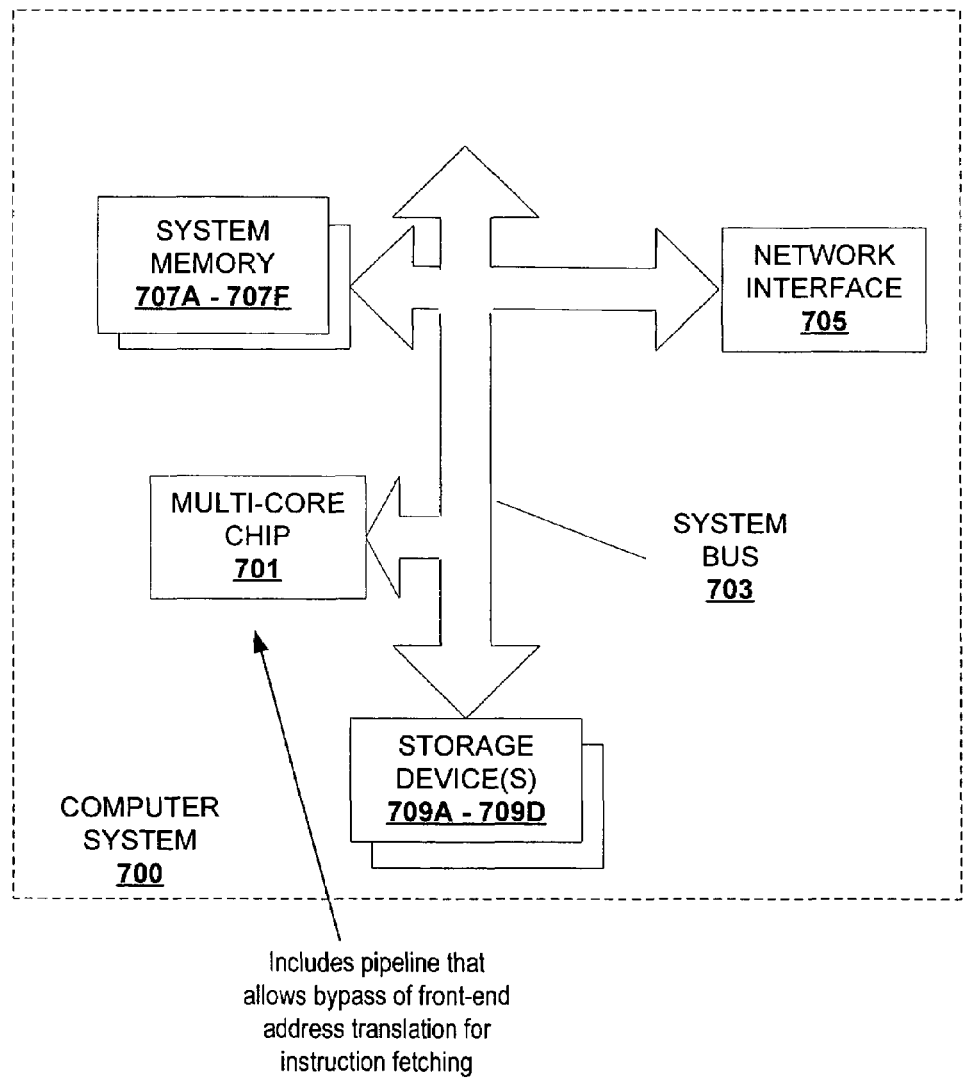
FIG. 7 depicts an exemplary computer system according to realizations of the invention.

FIG. 7 depicts an exemplary computer system according to realizations of the invention. A computer system 700 includes a multi-core chip 701. The computer system 700 also includes a system memory 707A-707F (e.g., one or more of cache, SRAM DRAM, RDRAM, EDO RAM, DDR RAM, EEPROM, etc.), a system bus 703 (e.g., LDT, PCI, ISA, etc.), a network interface 405 (e.g., an ATM interface, an Ethernet interface, a Frame Relay interface, etc.), and a storage device(s) 709A-709D (e.g., optical storage, magnetic storage, etc.). Realizations of the invention may include fewer or additional components not illustrated in FIG. 7 (e.g., video cards, audio cards, additional network interfaces, peripheral devices, etc.).

The multi-core chip 701, the storage device(s) 709A-709D, the network interface 705, and the system memory 707A-707F are coupled to the system bus 703. The multi-core chip 701 includes a pipeline that allows bypass of front-end address translation for instruction fetching.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor comprising:
   an instruction pipeline including:
      a fetch pipeline including:
         a first fetch substage, wherein said first fetch substage translates virtual addresses into physical addresses;
         a plurality of other fetch substages including:
            a second fetch substage coupled to said first fetch substage, wherein said second fetch substage performs branch prediction and accesses an instruction cache;
            a third fetch substage coupled to said second fetch substage, wherein said third fetch substage determines whether there is a hit or a miss in said instruction cache; and
            a fourth fetch substage wherein said fourth fetch substage determines a branch taken target, and further wherein in transition from said third fetch substage to said fourth fetch substage, an instruction instance read from said instruction cache is fetched into a fetch buffer; and
         a page boundary crossing event indicator wherein following said page boundary crossing event indicator indicating a page crossing event processing in said fetch pipeline goes to said first fetch substage, and otherwise processing in said fetch pipeline bypasses said first fetch substage wherein upon said bypassing, a cycle normally used by said first fetch substage is used by another fetch substage in said plurality of other fetch substages thereby enhancing the execution performance of said processor.

2. The processor of claim 1 wherein at least one of said plurality of other fetch substages recycles a previous address representation translation to generate an address representation translation for an instruction instance for fetching, wherein the generated address representation is an aggregate of the recycled translated address representation and an untranslated address representation.

3. The processor of claim 1, wherein a page boundary crossing event comprises any one of an exception, a branch mis-prediction, a linear page boundary crossing, and a non-linear page boundary crossing.

4. The processor of claim 3 wherein said fetch pipeline includes a sequential fetch computation unit wherein said sequential fetch computation unit increments a current instruction instance address representation to indicate a next fetch target and said sequential fetch computation unit detects a carry over at a particular bit position from the incrementing, wherein the carry over corresponds to a page boundary crossing event.

5. The processor of claim 3 wherein one of said plurality of other fetch substages detects and indicates a carry over at a particular bit position in computing a branch target, wherein carry over at the particular bit position corresponds to a page boundary crossing event.

6. The processor of claim 1 comprising multiple cores.

7. A chip that includes:
   a branch target computation unit having a branch target computation unit output line, wherein said branch target computation unit detects and indicates a carry over at a particular bit position in computing a branch target, wherein said carry over at the particular bit position corresponds to a page boundary crossing event and said branch target computation unit provides a signal on said branch target computation unit output line indicating whether a page boundary crossing event was detected;
   a line for providing a branch mis-prediction indication;
   a sequential fetch computation unit having a sequential fetch computation unit output line, wherein said sequential fetch computation unit provides a signal on said sequential fetch computation unit output line to indicate whether a page boundary crossing event was detected;
   a select unit having a select unit output line;
   an element, connected to said branch target computation unit output line, to said branch mis-prediction indication line, to said sequential fetch computation unit output line and to said select unit output line, having an element output line wherein in response to a signal on said select unit output line, said element passes the signal on one of said branch target computation unit output line, said branch mis-prediction indication, and said sequential fetch computation unit output line to said element output line;
   an address translation buffer connected to said element output line, wherein said addresss translation buffer conditions translation of address representations of instruction instances on whether said signal on said element output line indicates a page boundary crossing event occurs during execution of a stream of instruction instances and said address translation buffer bypasses address translation if said signal on said element output line indicates a page boundary crossing event did not occur.

8. A computer processor based method of collapsing address representation translation comprising:
   translating, if a page boundary crossing event is indicated, an address representation of an instruction instance with a translation buffer in a first fetch substage of a fetch pipeline of an instruction pipeline of a processor, wherein said fetch pipeline includes a plurality of fetch substages, and said plurality of fetch substages includes said first fetch substage;

a second fetch substage coupled to said first fetch substage, wherein said second fetch substage performs branch prediction and accesses an instruction cache;

a third fetch substage coupled to said second fetch substage, wherein said third fetch substage determines whether there is a hit or a miss in said instruction cache; and a fourth fetch substage wherein said fourth fetch substage determines a branch taken target, and further wherein in transition from said third fetch substage to said fourth fetch substage, an instruction instance read from said instruction cache is fetched into a fetch buffer; and bypassing, if a page boundary crossing event is not indicated, said first fetch substage, wherein upon said bypassing, said fetch pipeline uses a cycle, normally used by said first fetch substage, for another fetch substage in said plurality of substages thereby enhancing the execution performance of said processor.

9. The method of claim 8, wherein the page boundary crossing event is recognized in either linear execution of a stream of instruction instances or non-linear execution of the stream of instruction instances.

10. The method of claim 9, wherein the page boundary crossing recognized in non-linear execution of the stream of instruction instances results from one of branching and branch mis-prediction.

11. The method of claim 8 further comprising:

detecting a carry over at a particular bit position when computing a next fetch target; and indicating a page boundary crossing event responsive to the carry over detection.

\* \* \* \* \*